(12) United States Patent
Kulkarni

(10) Patent No.: US 8,913,073 B2
(45) Date of Patent: Dec. 16, 2014

(54) INTERPOLATION ACCORDING TO A FUNCTION REPRESENTED USING UNEVENLY SPACED SAMPLES OF THE FUNCTION

(75) Inventor: Manish S. Kulkarni, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1433 days.

(21) Appl. No.: 11/502,044

(22) Filed: Aug. 9, 2006

(65) Prior Publication Data

US 2008/0036783 A1    Feb. 14, 2008

(51) Int. Cl.
G09G 5/00 (2006.01)
H04N 1/60 (2006.01)
G06F 1/035 (2006.01)
G06F 17/17 (2006.01)

(52) U.S. Cl.
CPC ............ *H04N 1/6019* (2013.01); *G06F 1/035* (2013.01); *G06F 17/17* (2013.01)
USPC ........................................................ 345/581

(58) Field of Classification Search
USPC ........................................................ 345/581
See application file for complete search history.

(56) References Cited

U.S. PATENT DOCUMENTS

| | | | |
|---|---|---|---|
| 5,321,797 A | 6/1994 | Morton | |
| 5,870,077 A * | 2/1999 | Dillinger et al. | 345/600 |
| 5,943,058 A * | 8/1999 | Nagy | 345/582 |
| 6,321,245 B1 | 11/2001 | Cukier et al. | |
| 6,906,727 B2 * | 6/2005 | Weibrecht et al. | 345/600 |
| 6,933,949 B1 * | 8/2005 | McDonough et al. | 345/591 |
| 7,034,842 B1 * | 4/2006 | Sato et al. | 345/589 |
| 7,348,994 B2 * | 3/2008 | Nabeshima | 345/601 |
| 7,489,420 B2 * | 2/2009 | Bezryadin | 358/1.9 |
| 7,593,021 B1 * | 9/2009 | Tynefield et al. | 345/604 |
| 2004/0100466 A1 * | 5/2004 | Deering | 345/428 |
| 2004/0207624 A1 * | 10/2004 | Saito et al. | 345/426 |
| 2005/0237337 A1 * | 10/2005 | Leather et al. | 345/582 |
| 2007/0242070 A1 * | 10/2007 | Crow et al. | 345/441 |
| 2008/0028390 A1 | 1/2008 | Fors et al. | |

FOREIGN PATENT DOCUMENTS

| | | |
|---|---|---|
| EP | 0 706 287 | 4/1996 |
| EP | 1 107 090 | 6/2001 |

OTHER PUBLICATIONS

Mülhausen, Dorothée, Authorized Officer, PCT Application PCT/US2007/075399, International Search Report and Written Opinion, mailed Feb. 19, 2009, 9 pages.

* cited by examiner

*Primary Examiner* — Edward Martello
(74) *Attorney, Agent, or Firm* — Wolfe-SBMC

(57) ABSTRACT

The present disclosure includes systems and techniques relating to identifying function samples for use in interpolation. In general, in one implementation, the technique includes: obtaining a set of unevenly spaced sample points, x, and corresponding sample outputs, y, of a function y=f(x) within a domain; generating a data structure including first locations corresponding to a set of evenly spaced sample points within the domain, wherein the first locations store index values corresponding to second locations storing the sample outputs, y; receiving an input value of image data; identifying one of the first locations corresponding to the input value; finding two index values stored in the first locations using the one of the first locations as a starting point; and generating an image data output value corresponding to the input value by interpolation using two sample outputs, y, obtained from the second locations using the two index values.

15 Claims, 5 Drawing Sheets

INTERPOLATION ACCORDING TO A FUNCTION REPRESENTED USING UNEVENLY SPACED SAMPLES OF THE FUNCTION

BACKGROUND

The present disclosure relates to identifying function samples for use in interpolation, such as identifying appropriate interpolation inputs from a one dimensional sampled curve of a color profile using unevenly spaced samples.

Image processing applications often process image data using interpolation based on a sampled function. For example, the International Color Consortium (ICC) has defined a color profile format that includes one dimensional (1D) sampled curves. A 1D sampled curve represents a function y=f(x), where x is the input and y is the output, that can be used to process image data. The x-values of a 1D sampled curve in an ICC color profile are evenly spaced over a region of interest. For example, a curve defined over the domain [0, 1], with N samples would have x-values of $\{0, 1/(N-1), 2/(N-1), 3/(N-1), \ldots, 1\}$, and the corresponding y-values would be provided for each of these x-values. Thus, a given input value can be readily converted to two indices into the y-values according to: (1) first index=floor((N−1)*input value); and (2) second index=ceiling((N−1)*input value). The y-values located at the first and second indices can then be used in the interpolation performed for the input value. In other words, a simple indexing operation gives the points that should be used for interpolation.

Some have proposed that the ICC should adopt an interpolation method based on a function having unevenly spaced samples. The use of an uneven sampling of the input range of the function may be desirable both in ICC profiles, and in other applications. The use of uneven sampling of the input range allows one to specify more resolution (of the function) in a particular sub-range compared to a different sub-range. For example, a simple 8-sample curve may have x-values of $\{0, 0.1, 0.2, 0.3, 0.4, 0.6, 0.8, 1.0\}$ which provides a higher resolution in the lower range [0, 0.4], and a lower resolution in the higher range [0.4, 1]. However, when uneven sample points are used, a search operation (e.g., a binary search) is often required to determine where the input value falls in the set of x-value sample points, and thus which two sample y-values to use for interpolation.

SUMMARY

This specification describes technologies relating to identifying function samples for use in interpolation. In general, one aspect of the subject matter described in this specification can be embodied in a method that includes obtaining a set of unevenly spaced sample points, x, and corresponding sample outputs, y, of a function y=f(x) within a domain; generating a data structure including first locations corresponding to a set of evenly spaced sample points within the domain, wherein the first locations store index values corresponding to second locations storing the sample outputs, y; receiving an input value of image data; identifying one of the first locations corresponding to the input value; finding two index values stored in the first locations using the one of the first locations as a starting point; and generating an image data output value corresponding to the input value by interpolation using two sample outputs, y, obtained from the second locations using the two index values. Other embodiments of this aspect include corresponding systems, apparatus, and computer program products.

For example, one aspect of the subject matter described in this specification can be embodied in a computer program product, encoded on a computer-readable medium, operable to cause data processing apparatus to perform operations including receiving an input value of image data; identifying one of multiple first locations, corresponding to the input value, in a data structure storing index values corresponding to second locations, wherein the second locations store sample outputs, y, of a function y=f(x) within a domain, the function being represented by a set of unevenly spaced sample points, x, and the corresponding sample outputs, y, and the first locations correspond to a set of evenly spaced sample points within the domain; finding two index values stored in the first locations using the one of the first locations as a starting point; and generating an image data output value corresponding to the input value by interpolation using two sample outputs, y, obtained from the second locations using the two index values.

These and other embodiments can optionally include one or more of the following features. Obtaining the set of unevenly spaced sample points can involve acquiring or receiving a one dimensional sampled curve from a color profile in an image processing application. Generating the data structure can involve populating a first Graphics Processing Unit (GPU) texture with the index values corresponding to the second locations.

The GPU texture can include a multidimensional GPU texture, and the identifying can involve converting the input value to a one dimensional index value in accordance with the set of evenly spaced sample points within the domain; and converting the one dimensional index value to multidimensional coordinates into the first GPU texture, the multidimensional coordinates specifying the one of the first locations. The finding can involve looking up a first index value in the one of the first locations in the first GPU texture; and determining the first index value and a second index value such that corresponding x values in a second GPU texture bound the input value.

Determining the first and second index values can involve looking up an x value in the second GPU texture using the second index value being one different than the first index value; and incrementally increasing or decreasing the first and second index values while the x values corresponding to the first and second index values fail to bound the input value. Generating the image data output value can involve looking up the two sample outputs, y, in a third GPU texture, including the second locations, using the first and second index values; and interpolating between the two sample outputs, y, to obtain the output value. The interpolating can include performing linear interpolation, quadratic interpolation, or any other interpolation procedure. Moreover, the image data output value can be used in multiple different image processing application, and the method can further include rendering an image using the image data output value generated by interpolation According to another aspect of the subject matter described in this specification, a system can include a memory structure including an array of first locations storing index values corresponding to second locations, wherein the second locations store sample outputs, y, of a function y=f(x) within a domain, the function being represented by a set of unevenly spaced sample points, x, and the corresponding sample outputs, y, and the first locations correspond to a set of evenly spaced sample points within the domain; and one or more computers operable to effect an image processing application configured to receive an input value, identify one of the first locations corresponding to the input value, find two index values stored in the first locations using the one of the first locations as a starting point, and generate an output value corresponding to the input value by interpolation using two sample outputs, y, obtained from the second locations using the two index values.

Particular embodiments of the invention can be implemented to realize one or more of the following advantages. Input data from a digital image can be converted to indices into a set of unevenly spaced samples quickly and accurately using multiple data lookup tables to determine samples to be used for interpolation for the image data. Unevenly spaced samples can be stored and manipulated in a texture data array located within a graphics processing unit. This can result in improved system performance, allowing image data processing (using unevenly spaced samples for interpolation) to proceed more quickly and allowing a system's CPU (Central Processing Unit) to perform other operations while the interpolation activities ensue.

The details of one or more embodiments of the invention are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
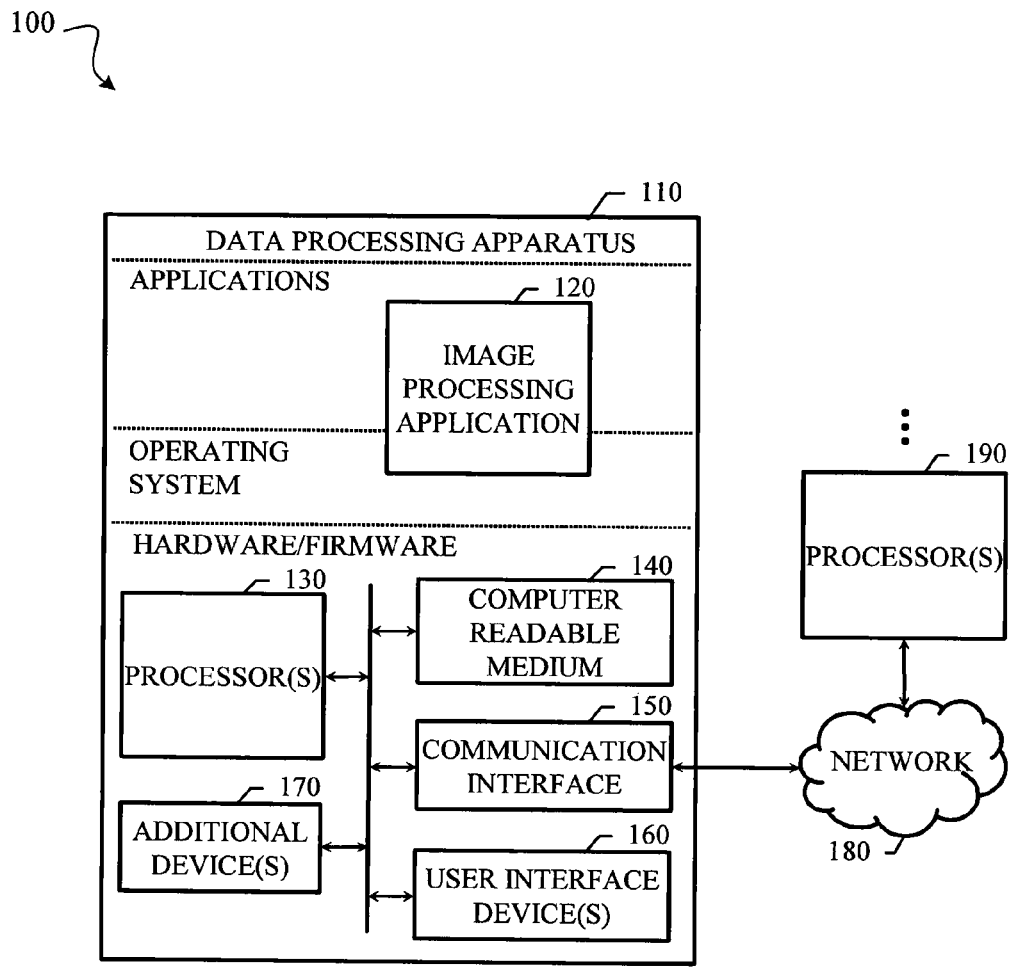
FIG. 1 shows an example system configured to process image data based on interpolation of a function represented using unevenly spaced samples of the function.

FIG. 1 shows an example system 100 configured to process image data based on interpolation of a function represented using unevenly spaced samples of the function. A data processing apparatus 110 can include hardware/firmware, an operating system and one or more applications, including an image processing application 120. As used herein, an application refers to a computer program that the user perceives as a distinct computer tool used for a defined purpose. An application 120 can be built entirely into the operating system (OS) of the data processing apparatus 110, or an application 120 can have different components located in different locations (e.g., one portion in the OS or kernel mode, one portion in the user mode, and one portion in a remote server). Moreover, an application 120 can be a graphical user interface application (e.g., a Web browser) that connects to one or more processors 190 (e.g., one or more Web servers) over a network 180 and provides the computer tool as a network service.

The image processing application 120 can include visual effects software (e.g., Adobe® After Effects® software, available from Adobe Systems Incorporated of San Jose, Calif.), image editing software (e.g., Adobe® Photoshop® software, available from Adobe Systems Incorporated of San Jose, Calif.), and video editing software (e.g., Adobe® Premiere® software, available from Adobe Systems Incorporated of San Jose, Calif.). Thus, the image processing application 120 can operate on digital images from many different sources. Moreover, a digital image (which for brevity will simply be referred to as an image) does not necessarily correspond to a file. An image may be stored in a portion of a file that holds other images, in a single file dedicated to the image in question, or in multiple coordinated files.

The data processing apparatus 110 includes one or more processors 130 and at least one computer-readable medium 140. The data processing apparatus 110 can also include a communication interface 150, one or more user interface devices 160, and one or more additional devices 170. The user interface device(s) 160 can include display screen(s), keyboard(s) (e.g., a custom video editing keyboard), mouse, stylus, or any combination thereof. Moreover, the data processing apparatus 110 can itself be considered a user interface device (e.g., when the image processing application 120 is delivered as a Web service).

The additional device(s) 170 can include various devices used for video and film editing. This can include a video controller coupled to a video recorder (which can be used for storing and importing video footage and for writing final output), a sound system, and a battery backup. Moreover, the subject matter described in this specification can be used in conjunction with any digital print engine or marking engine, display monitor, or other raster output device capable of producing color or gray scale pixels on paper, film, display screen, or other output medium.

Once properly programmed, the data processing apparatus 110 is operable to generate an image data output value by interpolation of unevenly spaced sample points. Sample points can be obtained by acquiring a one dimensional sampled curve from a color profile (e.g., an ICC profile) in the image processing application 120. In other embodiments, the sample points can be obtained by acquiring a two or three dimensional sampled curve from a color profile. Sample points can be stored and processed in various types of arrays, including in data arrays in any of the processors within system 100. As used herein, a data array refers to a memory structure included within a processor. For example, a texture is a type of data array included in many modern processors and made readily available to video rendering processors, such as Graphics Processing Units (GPUs), included within a processor.

Figure 2:
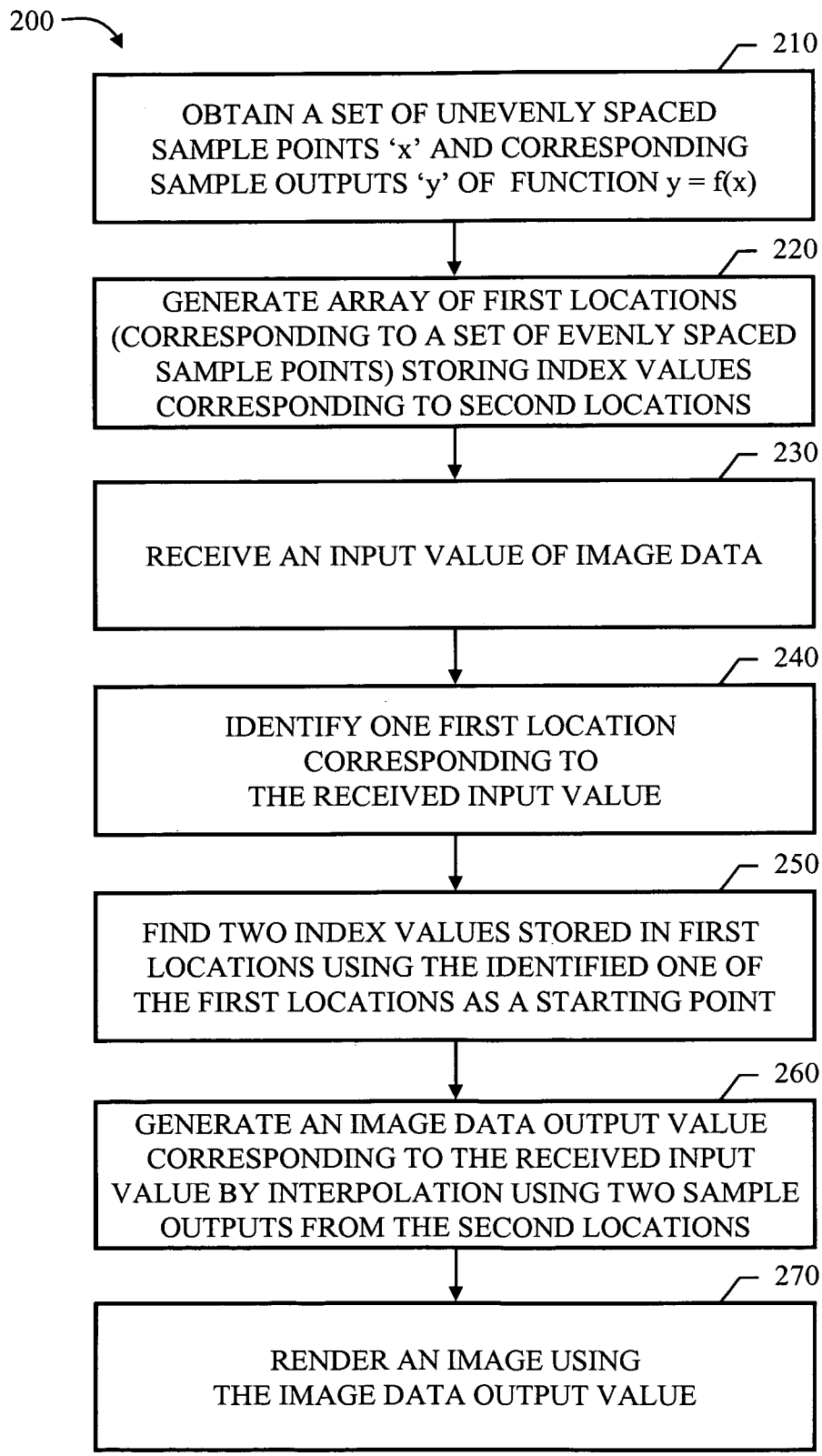
FIG. 2 is a flow chart showing an example process of interpolating, using unevenly spaced sample points, to generate an image.

FIG. 2 is a flow chart showing an example process 200 of interpolating, using unevenly spaced sample points, to generate an image. A set of unevenly spaced sample points 'x' and corresponding sample outputs 'y' are obtained 210 for a function, y=f(x). Obtaining the set of sample points can involve acquiring a one dimensional sample curve from a color profile, where the color profile is available in the image processing application 120. Typically, the sample curve is determined at the time the color profile is generated and provides the color profile with certain image processing capabilities.

An array of first locations corresponding to a set of evenly spaced sample points within the function domain can be generated 220 (e.g., by a software module in the image processing application 120). The array can be a one dimensional or multidimensional array and can be stored in various types of data structures and memory structures, including a data array. After generation, the first locations of the array store index values corresponding to second locations that store the sample outputs. For example, three separate arrays can be created, where a first array (including the first locations) holds index values corresponding to the second and third arrays, the second array holds the unevenly spaced sample points x, and the third array (including the second locations) holds the corresponding sample outputs y. Thus, the first array maps an input value to a corresponding sample point x in the second array, and to a sample output, y, (corresponding to the sample point x) in the third array. The various arrays can be stored in one or more data structures in one or more memory structures, including memory on a processor, such as memory cells within a GPU. Moreover, the data structures available for use are not limited to traditional array type data structures, and can include other data structures suitable for rapid look up of a stored value based on an input value corresponding to a location within the data structure (e.g., a hash table).

An input value of image data is received 230, potentially along with a complete image. One of the first locations is then identified 240 as corresponding to the received input value. This can be done by converting the received input value to an index into the first locations in accordance with the set of evenly spaced sample points within the domain. For example, the input value (in the range 0.0 to 1.0) can be multiplied by one less than the total number of first locations and then floored to the nearest integer, which is then an index to the one location in the first locations.

Two index values stored in the first locations can be found 250 using the identified one of the first locations as a starting point. This can involve looking up a first index value in one of the first locations, and determining the first index value and a second index value such that corresponding x values (of the unevenly spaced sample points) bound the input value. For example, the second array (containing the unevenly spaced sample points x) can be checked at the first index value (obtained from the identified one of the first locations) and the second index value (being one greater than the first index value, or one less, depending on implementation). The first and second index values can then be incremented (or decremented, depending on implementation) until the input value falls between the two sample points indicated in the second array by the first and second index values.

An image data output value (corresponding to the input value) is generated 260 by interpolation using two sample outputs, y, obtained from the second locations using the two index values. For example, once the first and second index values are known for the second array, these same index values can be used to locate the corresponding sample outputs in the third array. The interpolation can be a linear interpolation (or other, higher order interpolation) that uses the input value, the two sample points from the second array and the two corresponding sample outputs from the third array.

In alternative embodiments, the three arrays described above may be combined into less than three arrays. For example, one array may contain the first, second and third arrays discussed above. In other embodiments, more than three arrays can be used to store data points and indexing values. Moreover, several operations may be performed on the one or more arrays, including one or more data arrays.

Finally, an image can be rendered 270 using the image data output value generated by interpolation. This can involve preparing the image, including the image data output value, and sending it to a display engine or other software component. Alternatively, this can involve interfacing directly with a display device to present the image. Such image rendering can be used in multiple different image processing applications, including digital motion picture editing, digital photo editing, visual effects creation, and image display processes generally.

Figure 3:
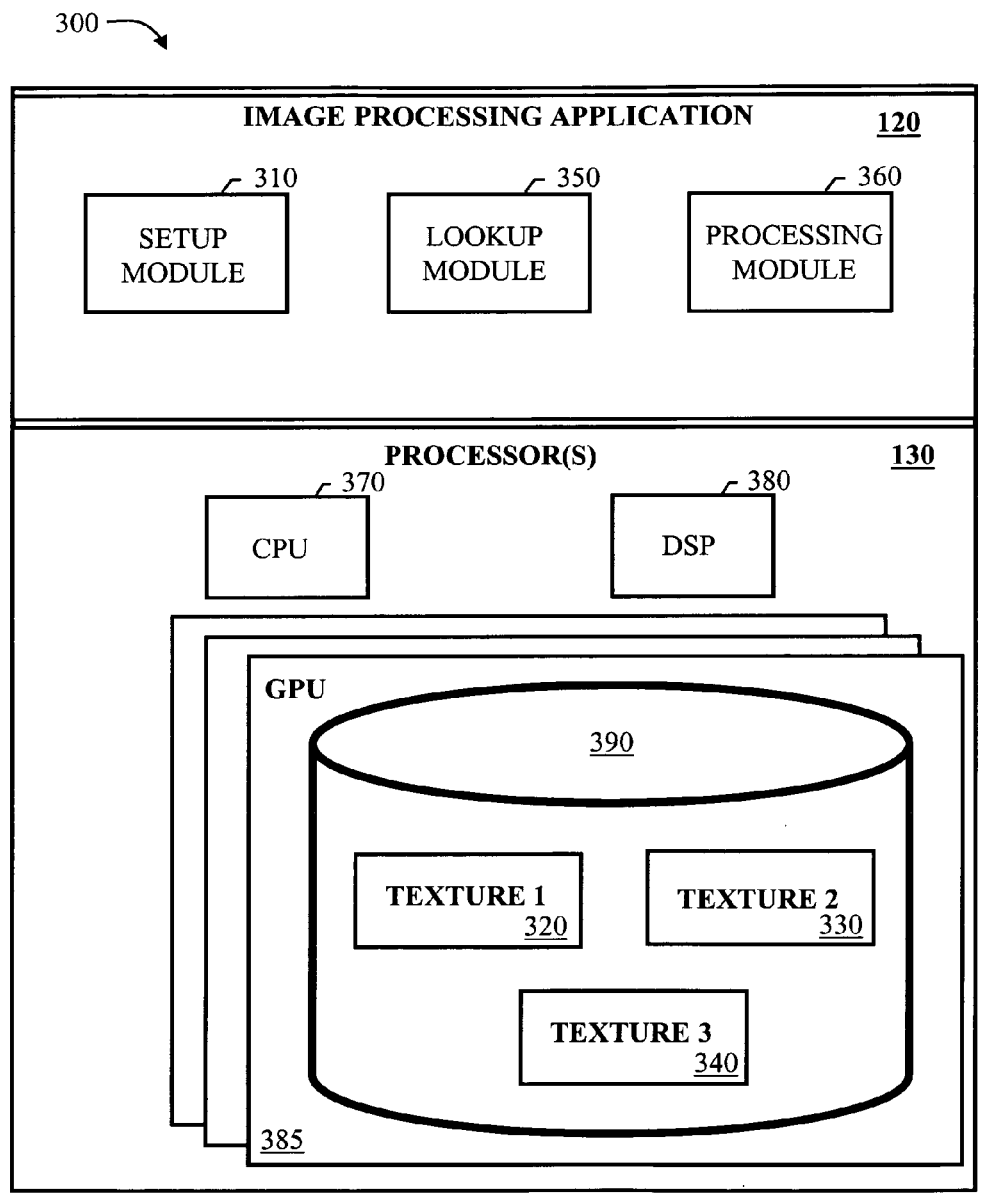
FIG. 3 shows an example system configured to perform operations on data arrays located in a graphics processing unit.

FIG. 3 shows an example system 300 configured to perform operations on data arrays located in a graphics processing unit. The example system 300 can be a computer system running image processing software 120 using processor(s) 130. In this example, the image processing application 120 includes three software modules that can perform specific operations on textures located within processor memory. The modules can contain code to process image data in a manner defined by an ICC profile. For example, a setup module 310 can include instructions to generate and configure data structures (e.g., a data array such as a GPU texture) from a received set of input samples for the example system 300. The setup module 310 can generate any number of textures storing data. In the example shown in FIG. 3, a first texture 320 can store index values corresponding to data stored in a second texture 330 and a third texture 340. The second texture 330 can hold a set of unevenly spaced sample points x. The third array 340 can hold the corresponding output samples, y. The setup module 310 can configure a mapping or indexing network between the three textures, populating the three textures with appropriate data. Once properly configured, the system 300 is operable to process received image data. For example, image data output may be generated from received data through interpolation.

A lookup module 350 can include instructions to identify data points in the system 300. For example, the lookup module 350 can identify two sample points (e.g., x1 and x2) that bound an input data point in an image. This can involve looking up a first index value in the first texture 320, and determining the first index value and a second index value such that corresponding x values, of the unevenly spaced sample points in the second texture 330, bound the input value. If the input value is not initially between the x values for the two identified index values, the lookup module 350 can increment or decrement the index values until the input value is between the x values for the two index values. The lookup module 350 may also use more advanced search techniques, although in practice, a simple increment/decrement approach should identify the correct index values rather quickly; in many cases, no increment/decrement will be needed at all since the initially identified index values will often be correct. Once the x values for the two index values bound the input value, the lookup module 350 can identify corresponding output values (e.g., y1 and y2) in the third texture 340 using the two index values.

A processing module 360 can include instructions to perform operations on an identified set of data points (e.g., the input data point, the identified sample points x1 & x2 and the identified output values y1 & y2). Processing operations can include generating an image data output value corresponding to the input value by interpolating between the two sample outputs (e.g., y1 and y2).

The system 300 can include multiple processors for performing the above operations in the system. As shown in FIG. 3, the processor(s) 130 include a Central Processing Unit (CPU) 370, a Digital Signal Processor (DSP) 380, and one or more Graphics Processing Unit (GPU) 385. The CPU 370 can perform setup tasks using setup module 310, lookup tasks using lookup module 350, and other processing tasks using processing module 360. In addition, the CPU 370 can perform other system functions as necessary. In this example, only one CPU is shown, however multiple processor architecture configurations are possible, including potentially multiple CPUs in some implementations.

The DSP 380 can perform mathematical manipulations of data in the textures in the system 300. For example, the DSP 380 can window (pre-multiply) received input data before storing the data into a texture. In some embodiments, the DSP 380 can filter data in a texture. In addition, the DSP 380 can perform mathematical operations requested by another processor in the system.

The system 300 shows a Graphics Processing Unit (GPU) 385. GPUs are typically designed to quickly process large data sets and can receive instructions from other processors or applications in a system. In this example, the GPU 385 includes a memory store 390. The memory store 390 can include different types of memory structures, such as multiple textures or data arrays, and can store several types of data, including interpolation data, system configurations, and graphics data. As shown in FIG. 3, the memory store 390 includes the first texture 320, the second texture 330, and the third texture 340 as described above. Although only three textures are shown for simplicity, it is possible to have several textures in one memory store or several textures over several memory stores. The three textures shown can be separate data arrays or simply different sections of a single data array. Multiple configurations are possible. In other embodiments, several GPUs may be present in the system and each can interact with one another, or alternatively, can be unaware of the existence of the other GPUs in the system 300.

GPUs can be implemented as specialized random-access memory (RAM) that is designed for rapid reading and writing, enabling attached graphics hardware increased performance in rendering 3D imagery. Generally, larger amounts of texture memory allow for more detailed images. GPU 385 can be communicatively coupled to personal computer memory to transfer data to and from the textures located in the GPU 385. Each texture can have a particular configuration of sizes and stored data. Stored data can consist of image data, indexing data, compressed image data, and any other storable data. The three textures can store the index values, sample points x and sample points y (as described above), and can be used to perform a linear interpolation for processing image data, which can also be stored in the memory store 390.

Figure 4:
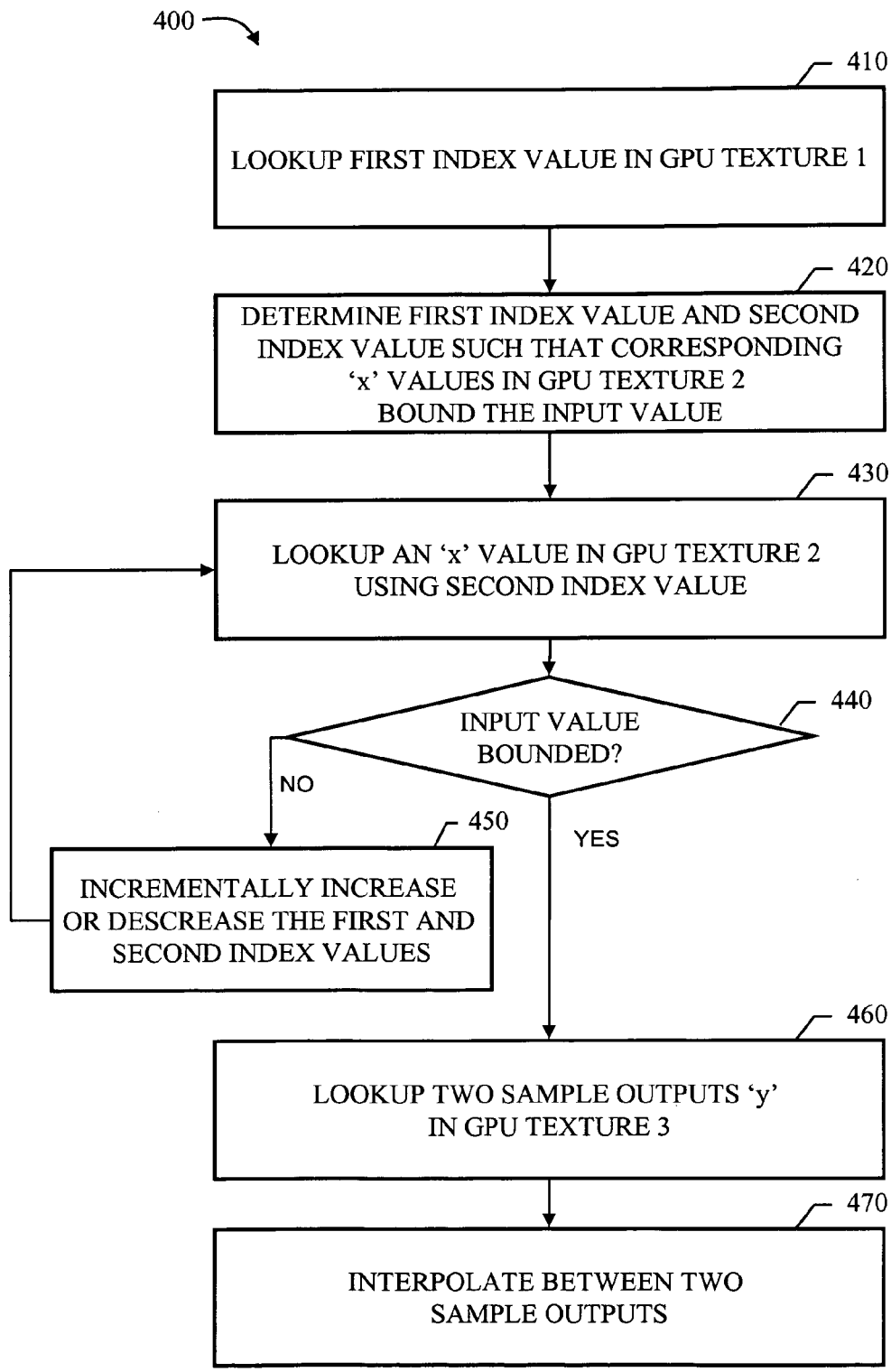
FIG. 4 is a flow chart showing an example process of generating an array for a linear interpolation.

FIG. 4 is a flow chart showing an example process 400 of generating an array for a linear interpolation. Upon receiving an input value, a first index value can be identified 410 in one of the first locations. For example, the lookup module 350 can lookup the first index value in the first texture 320 (FIG. 3). Two index values can be determined 420, such that their corresponding x-values (e.g, contained in the second texture 330) bound the input value received.

The second index value determined above can be used to lookup 430 the location of the x-value in the second texture 330. If the first and second index values do not bound 440 the input value, both index values can be incrementally increased or decreased 450 until the input value is bounded. When the two index values bound 440 the input value, then the index values can be used to lookup 460 two sample output values 'y' (e.g., located in the third texture 340). Upon determining that two appropriate output values have been obtained, the process 400 can perform 470 an interpolation between the two sample output values to generate an output value for the input value. A specific example of the process 400 is depicted in the description of FIG. 5.

Figure 5:
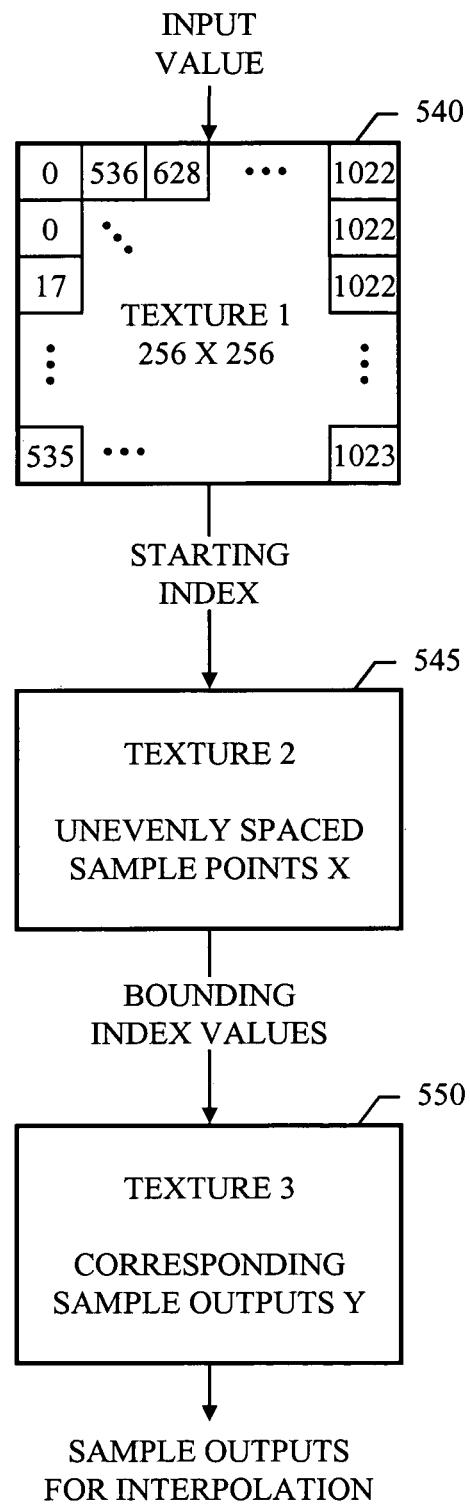
FIG. 5 is a block diagram showing example texture(s) used in a graphics processing unit.

FIG. 5 is a block diagram showing example texture(s) used in a graphics processing unit (GPU). In this example, the GPU texture(s) are shown and described as three separate textures, the first of which being multidimensional. It should be appreciated that various combinations of one or more textures, having one or more dimensions, can be used. For example, a one dimensional texture can be used as though it were a two dimensional texture (by appropriate conversion of 2D index values into 1D index values), and a two dimensional texture can be used as though it were a one dimensional texture (by appropriate conversion of 1D index values to 2D index values).

A first texture 540 can be a two dimensional texture with 256×256 entries, a second texture 545 can be a one dimensional texture with 1024 entries, and a third texture 550 can be a one dimensional texture with 1024 entries (note that these textures can also be larger, but only a portion of a texture need be used; thus, the second and third textures 545 and 550 can be separate portions of a single four kilobyte 1D texture). In the example now described, N=256, and the first texture 540 stores 256×256=65536 index values in the range [0, 1023]. An input value can be converted to a one dimensional index value in accordance with a set of evenly spaced sample points: p=floor(input value*(N^2-1)). This one dimensional index value can be converted to a two dimensional index of (u, v), where v=floor(p/N) and u=p−N*floor(p/N). The (u, v) coordinates can be used to lookup, in the two dimensional texture 540, the index value for lookup into the next texture.

Referring to Table 1 below, an example of sample points in a one dimensional sampled curve with 1024 unevenly spaced samples is shown. An indexing column (INDX) shows index values for corresponding unevenly spaced sample points x (shown in the X column) and sample outputs y (shown in the Y column). As shown in the example of FIG. 5, the first texture 540 contains index values (0 to 1023) in 65536 entries arranged as a two dimensional 256×256 texture. For a given input value in the input range, the two dimensional index (u, v) locates an entry in the first texture 540 having an index into the second texture 545. This index into the second texture 545 locates a sample point x that is known to be less than the original input value. For example, an input value of 0.45778 corresponds to the 1D entry=floor(0.45778*65535)=30,000, which corresponds to u=48 and v=117 in the first texture 540. This location in the first texture 540 contains the index value 1015, which points to a sample point (0.426114) that is known to be less than the input value. The first texture 540 can be filled with index values according to the following pseudo code:

```
Index = 0;
    for (I = 0 to (N*N-1)) {
        if (Texture_2[Index] > I/(N*N-1)) then increment Index;
        v = floor(I/N);
        u = I-N*v;
        Texture_1[u, v] = Index;
    }
```

The second texture 545 contains the unevenly spaced sample points (e.g., the X column of data in Table 1). The index values stored in the first texture 540 point to x-values in the second texture 545. For example, the input value of 0.45778 can be looked up in the first texture 540 (as described above) to determine the starting index of 1015. This starting index can be used with the second texture 545 to determine bounding index values, which may be the starting index (1015) and one greater than the starting index (1016). In this example, the corresponding x-values from the second texture 545 are Texture_2[1015]=0.426114 and Texture__2[1016] =0.465697. Thus, the starting index (1015) and the index value one greater (1016) already bound the input value 0.45778 with their corresponding sample points 0.426114 and 0.465697.

However, these two initial index values may need to be incremented one or more times (typically no more than five times and usually less) before the bounding index values are found, depending on the specific data values involved. Thus, after determining the starting index and its corresponding x-value, a verification operation can be performed to ensure the sample point corresponding to the first index value is less than the original input x-value, and sample point corresponding to the second index value (first index value plus one) is greater than the original input x-value. Once the bounding first and second index values (which identify sample points that bound the input value) have been found, the corresponding sample y-values can be obtained from a third texture 550. These sample outputs can then be provided for interpolation. In this example, the sample y-value corresponding to index 1015 is 0.992180, and the sample y-value corresponding to index 1016 is 0.993157, as shown in Table 1 below.

TABLE 1

1-D Sampled Curve with 1024 Unevenly Spaced Samples

| INDX | X | Y |
| --- | --- | --- |
| 0 | 0.0000245 | 0 |
| 1 | 0.0000247 | 0.000978 |
| 2 | 0.0000250 | 0.001955 |
| 3 | 0.0000253 | 0.002933 |
| 4 | 0.0000256 | 0.00391 |
| 5 | 0.0000259 | 0.004888 |
| 6 | 0.0000262 | 0.005865 |
| 7 | 0.0000265 | 0.006843 |
| 8 | 0.0000268 | 0.00782 |
| 9 | 0.0000271 | 0.008798 |
| 10 | 0.0000274 | 0.009775 |
| 11 | 0.0000278 | 0.010753 |
| 12 | 0.0000281 | 0.01173 |
| 13 | 0.0000284 | 0.012708 |
| 14 | 0.0000287 | 0.013685 |
| 15 | 0.0000291 | 0.014663 |
| 16 | 0.0000294 | 0.01564 |
| 17 | 0.0000297 | 0.016618 |
| 18 | 0.0000301 | 0.017595 |
| 19 | 0.0000304 | 0.018573 |
| 20 | 0.0000308 | 0.01955 |
| 21 | 0.0000311 | 0.020528 |
| 22 | 0.0000315 | 0.021505 |
| 23 | 0.0000319 | 0.022483 |
| 24 | 0.0000322 | 0.02346 |
| 25 | 0.0000326 | 0.024438 |
| 26 | 0.0000330 | 0.025415 |
| 27 | 0.0000334 | 0.026393 |
| 28 | 0.0000337 | 0.02737 |
| 29 | 0.0000341 | 0.028348 |
| 30 | 0.0000345 | 0.029326 |
| 31 | 0.0000349 | 0.030303 |
| 32 | 0.0000353 | 0.031281 |
| 33 | 0.0000357 | 0.032258 |
| 34 | 0.0000361 | 0.033236 |
| 35 | 0.0000366 | 0.034213 |
| 36 | 0.0000370 | 0.035191 |
| 37 | 0.0000374 | 0.036168 |
| 38 | 0.0000378 | 0.037146 |
| 39 | 0.0000383 | 0.038123 |
| 40 | 0.0000387 | 0.039101 |
| 41 | 0.0000392 | 0.040078 |
| 42 | 0.0000396 | 0.041056 |
| 43 | 0.0000401 | 0.042033 |
| 44 | 0.0000405 | 0.043011 |
| 45 | 0.0000410 | 0.043988 |
| 46 | 0.0000415 | 0.044966 |
| 47 | 0.0000420 | 0.045943 |
| 48 | 0.0000425 | 0.046921 |
| 49 | 0.0000429 | 0.047898 |
| 50 | 0.0000434 | 0.048876 |
| 51 | 0.0000439 | 0.049853 |
| 52 | 0.0000445 | 0.050831 |
| 53 | 0.0000450 | 0.051808 |
| 54 | 0.0000455 | 0.052786 |
| 55 | 0.0000460 | 0.053763 |
| 56 | 0.0000465 | 0.054741 |
| 57 | 0.0000471 | 0.055718 |

TABLE 1-continued

1-D Sampled Curve with 1024 Unevenly Spaced Samples

| INDX | X | Y |
| --- | --- | --- |
| 58 | 0.0000476 | 0.056696 |
| 59 | 0.0000482 | 0.057674 |
| 60 | 0.0000487 | 0.058651 |
| 61 | 0.0000493 | 0.059629 |
| 62 | 0.0000499 | 0.060606 |
| 63 | 0.0000504 | 0.061584 |
| 64 | 0.0000510 | 0.062561 |
| 65 | 0.0000516 | 0.063539 |
| 66 | 0.0000522 | 0.064516 |
| 67 | 0.0000528 | 0.065494 |
| 68 | 0.0000534 | 0.066471 |
| 69 | 0.0000540 | 0.067449 |
| 70 | 0.0000547 | 0.068426 |
| 71 | 0.0000553 | 0.069404 |
| 72 | 0.0000559 | 0.070381 |
| 73 | 0.0000566 | 0.071359 |
| 74 | 0.0000572 | 0.072336 |
| 75 | 0.0000579 | 0.073314 |
| 76 | 0.0000586 | 0.074291 |
| 77 | 0.0000592 | 0.075269 |
| 78 | 0.0000599 | 0.076246 |
| 79 | 0.0000606 | 0.077224 |
| 80 | 0.0000613 | 0.078201 |
| 81 | 0.0000620 | 0.079179 |
| 82 | 0.0000627 | 0.080156 |
| 83 | 0.0000635 | 0.081134 |
| 84 | 0.0000642 | 0.082111 |
| 85 | 0.0000649 | 0.083089 |
| 86 | 0.0000657 | 0.084066 |
| 87 | 0.0000665 | 0.085044 |
| 88 | 0.0000672 | 0.086022 |
| 89 | 0.0000680 | 0.086999 |
| 90 | 0.0000688 | 0.087977 |
| 91 | 0.0000696 | 0.088954 |
| 92 | 0.0000704 | 0.089932 |
| 93 | 0.0000712 | 0.090909 |
| 94 | 0.0000720 | 0.091887 |
| 95 | 0.0000729 | 0.092864 |
| 96 | 0.0000737 | 0.093842 |
| 97 | 0.0000745 | 0.094819 |
| 98 | 0.0000754 | 0.095797 |
| 99 | 0.0000763 | 0.096774 |
| 100 | 0.0000772 | 0.097752 |
| 101 | 0.0000780 | 0.098729 |
| 102 | 0.0000790 | 0.099707 |
| 103 | 0.0000799 | 0.100684 |
| 104 | 0.0000808 | 0.101662 |
| 105 | 0.0000817 | 0.102639 |
| 106 | 0.0000827 | 0.103617 |
| 107 | 0.0000836 | 0.104594 |
| 108 | 0.0000846 | 0.105572 |
| 109 | 0.0000856 | 0.106549 |
| 110 | 0.0000866 | 0.107527 |
| 111 | 0.0000876 | 0.108504 |
| 112 | 0.0000886 | 0.109482 |
| 113 | 0.0000896 | 0.110459 |
| 114 | 0.0000906 | 0.111437 |
| 115 | 0.0000917 | 0.112414 |
| 116 | 0.0000927 | 0.113392 |
| 117 | 0.0000938 | 0.11437 |
| 118 | 0.0000949 | 0.115347 |
| 119 | 0.0000960 | 0.116325 |
| 120 | 0.0000971 | 0.117302 |
| 121 | 0.0000982 | 0.11828 |
| 122 | 0.0000993 | 0.119257 |
| 123 | 0.0001005 | 0.120235 |
| 124 | 0.0001017 | 0.121212 |
| 125 | 0.0001028 | 0.12219 |
| 126 | 0.0001040 | 0.123167 |
| 127 | 0.0001052 | 0.124145 |
| 128 | 0.0001064 | 0.125122 |
| 129 | 0.0001077 | 0.1261 |
| 130 | 0.0001089 | 0.127077 |
| 131 | 0.0001102 | 0.128055 |
| 132 | 0.0001114 | 0.129032 |
| 133 | 0.0001127 | 0.13001 |

TABLE 1-continued

1-D Sampled Curve with 1024 Unevenly Spaced Samples

| INDX | X | Y |
|---|---|---|
| 134 | 0.0001140 | 0.130987 |
| 135 | 0.0001153 | 0.131965 |
| 136 | 0.0001167 | 0.132942 |
| 137 | 0.0001180 | 0.13392 |
| 138 | 0.0001194 | 0.134897 |
| 139 | 0.0001208 | 0.135875 |
| 140 | 0.0001222 | 0.136852 |
| 141 | 0.0001236 | 0.13783 |
| 142 | 0.0001250 | 0.138807 |
| 143 | 0.0001265 | 0.139785 |
| 144 | 0.0001279 | 0.140762 |
| 145 | 0.0001294 | 0.14174 |
| 146 | 0.0001309 | 0.142717 |
| 147 | 0.0001324 | 0.143695 |
| 148 | 0.0001339 | 0.144673 |
| 149 | 0.0001355 | 0.14565 |
| 150 | 0.0001370 | 0.146628 |
| 151 | 0.0001386 | 0.147605 |
| 152 | 0.0001402 | 0.148583 |
| 153 | 0.0001418 | 0.14956 |
| 154 | 0.0001435 | 0.150538 |
| 155 | 0.0001451 | 0.151515 |
| 156 | 0.0001468 | 0.152493 |
| 157 | 0.0001485 | 0.15347 |
| 158 | 0.0001502 | 0.154448 |
| 159 | 0.0001520 | 0.155425 |
| 160 | 0.0001537 | 0.156403 |
| 161 | 0.0001555 | 0.15738 |
| 162 | 0.0001573 | 0.158358 |
| 163 | 0.0001591 | 0.159335 |
| 164 | 0.0001610 | 0.160313 |
| 165 | 0.0001628 | 0.16129 |
| 166 | 0.0001647 | 0.162268 |
| 167 | 0.0001666 | 0.163245 |
| 168 | 0.0001685 | 0.164223 |
| 169 | 0.0001705 | 0.1652 |
| 170 | 0.0001724 | 0.166178 |
| 171 | 0.0001744 | 0.167155 |
| 172 | 0.0001764 | 0.168133 |
| 173 | 0.0001785 | 0.16911 |
| 174 | 0.0001805 | 0.170088 |
| 175 | 0.0001826 | 0.171065 |
| 176 | 0.0001847 | 0.172043 |
| 177 | 0.0001869 | 0.173021 |
| 178 | 0.0001890 | 0.173998 |
| 179 | 0.0001912 | 0.174976 |
| 180 | 0.0001934 | 0.175953 |
| 181 | 0.0001957 | 0.176931 |
| 182 | 0.0001979 | 0.177908 |
| 183 | 0.0002002 | 0.178886 |
| 184 | 0.0002025 | 0.179863 |
| 185 | 0.0002049 | 0.180841 |
| 186 | 0.0002072 | 0.181818 |
| 187 | 0.0002096 | 0.182796 |
| 188 | 0.0002121 | 0.183773 |
| 189 | 0.0002145 | 0.184751 |
| 190 | 0.0002170 | 0.185728 |
| 191 | 0.0002195 | 0.186706 |
| 192 | 0.0002220 | 0.187683 |
| 193 | 0.0002246 | 0.188661 |
| 194 | 0.0002272 | 0.189638 |
| 195 | 0.0002298 | 0.190616 |
| 196 | 0.0002325 | 0.191593 |
| 197 | 0.0002351 | 0.192571 |
| 198 | 0.0002379 | 0.193548 |
| 199 | 0.0002406 | 0.194526 |
| 200 | 0.0002434 | 0.195503 |
| 201 | 0.0002462 | 0.196481 |
| 202 | 0.0002491 | 0.197458 |
| 203 | 0.0002518 | 0.198436 |
| 204 | 0.0002544 | 0.199413 |
| 205 | 0.0002570 | 0.200391 |
| 206 | 0.0002596 | 0.201369 |
| 207 | 0.0002623 | 0.202346 |
| 208 | 0.0002650 | 0.203324 |
| 209 | 0.0002677 | 0.204301 |
| 210 | 0.0002704 | 0.205279 |
| 211 | 0.0002732 | 0.206256 |
| 212 | 0.0002760 | 0.207234 |
| 213 | 0.0002788 | 0.208211 |
| 214 | 0.0002816 | 0.209189 |
| 215 | 0.0002845 | 0.210166 |
| 216 | 0.0002874 | 0.211144 |
| 217 | 0.0002903 | 0.212121 |
| 218 | 0.0002933 | 0.213099 |
| 219 | 0.0002963 | 0.214076 |
| 220 | 0.0002993 | 0.215054 |
| 221 | 0.0003024 | 0.216031 |
| 222 | 0.0003055 | 0.217009 |
| 223 | 0.0003086 | 0.217986 |
| 224 | 0.0003117 | 0.218964 |
| 225 | 0.0003149 | 0.219941 |
| 226 | 0.0003181 | 0.220919 |
| 227 | 0.0003214 | 0.221896 |
| 228 | 0.0003247 | 0.222874 |
| 229 | 0.0003280 | 0.223851 |
| 230 | 0.0003313 | 0.224829 |
| 231 | 0.0003347 | 0.225806 |
| 232 | 0.0003381 | 0.226784 |
| 233 | 0.0003416 | 0.227761 |
| 234 | 0.0003451 | 0.228739 |
| 235 | 0.0003486 | 0.229717 |
| 236 | 0.0003522 | 0.230694 |
| 237 | 0.0003558 | 0.231672 |
| 238 | 0.0003594 | 0.232649 |
| 239 | 0.0003631 | 0.233627 |
| 240 | 0.0003668 | 0.234604 |
| 241 | 0.0003705 | 0.235582 |
| 242 | 0.0003743 | 0.236559 |
| 243 | 0.0003781 | 0.237537 |
| 244 | 0.0003820 | 0.238514 |
| 245 | 0.0003859 | 0.239492 |
| 246 | 0.0003898 | 0.240469 |
| 247 | 0.0003938 | 0.241447 |
| 248 | 0.0003978 | 0.242424 |
| 249 | 0.0004015 | 0.243402 |
| 250 | 0.0004052 | 0.244379 |
| 251 | 0.0004089 | 0.245357 |
| 252 | 0.0004126 | 0.246334 |
| 253 | 0.0004164 | 0.247312 |
| 254 | 0.0004202 | 0.248289 |
| 255 | 0.0004241 | 0.249267 |
| 256 | 0.0004279 | 0.250244 |
| 257 | 0.0004319 | 0.251222 |
| 258 | 0.0004358 | 0.252199 |
| 259 | 0.0004398 | 0.253177 |
| 260 | 0.0004438 | 0.254154 |
| 261 | 0.0004479 | 0.255132 |
| 262 | 0.0004520 | 0.256109 |
| 263 | 0.0004561 | 0.257087 |
| 264 | 0.0004603 | 0.258065 |
| 265 | 0.0004645 | 0.259042 |
| 266 | 0.0004687 | 0.26002 |
| 267 | 0.0004730 | 0.260997 |
| 268 | 0.0004774 | 0.261975 |
| 269 | 0.0004817 | 0.262952 |
| 270 | 0.0004861 | 0.26393 |
| 271 | 0.0004906 | 0.264907 |
| 272 | 0.0004951 | 0.265885 |
| 273 | 0.0004996 | 0.266862 |
| 274 | 0.0005042 | 0.26784 |
| 275 | 0.0005088 | 0.268817 |
| 276 | 0.0005134 | 0.269795 |
| 277 | 0.0005181 | 0.270772 |
| 278 | 0.0005229 | 0.27175 |
| 279 | 0.0005277 | 0.272727 |
| 280 | 0.0005325 | 0.273705 |
| 281 | 0.0005374 | 0.274682 |
| 282 | 0.0005423 | 0.27566 |
| 283 | 0.0005472 | 0.276637 |
| 284 | 0.0005523 | 0.277615 |
| 285 | 0.0005573 | 0.278592 |

TABLE 1-continued

1-D Sampled Curve with 1024 Unevenly Spaced Samples

| INDX | X | Y |
|---|---|---|
| 286 | 0.0005624 | 0.27957 |
| 287 | 0.0005676 | 0.280547 |
| 288 | 0.0005727 | 0.281525 |
| 289 | 0.0005780 | 0.282502 |
| 290 | 0.0005833 | 0.28348 |
| 291 | 0.0005886 | 0.284457 |
| 292 | 0.0005940 | 0.285435 |
| 293 | 0.0005994 | 0.286413 |
| 294 | 0.0006049 | 0.28739 |
| 295 | 0.0006104 | 0.288368 |
| 296 | 0.0006160 | 0.289345 |
| 297 | 0.0006217 | 0.290323 |
| 298 | 0.0006274 | 0.2913 |
| 299 | 0.0006329 | 0.292278 |
| 300 | 0.0006381 | 0.293255 |
| 301 | 0.0006434 | 0.294233 |
| 302 | 0.0006488 | 0.29521 |
| 303 | 0.0006541 | 0.296188 |
| 304 | 0.0006596 | 0.297165 |
| 305 | 0.0006650 | 0.298143 |
| 306 | 0.0006705 | 0.29912 |
| 307 | 0.0006761 | 0.300098 |
| 308 | 0.0006817 | 0.301075 |
| 309 | 0.0006873 | 0.302053 |
| 310 | 0.0006930 | 0.30303 |
| 311 | 0.0006988 | 0.304008 |
| 312 | 0.0007046 | 0.304985 |
| 313 | 0.0007104 | 0.305963 |
| 314 | 0.0007163 | 0.30694 |
| 315 | 0.0007222 | 0.307918 |
| 316 | 0.0007282 | 0.308895 |
| 317 | 0.0007343 | 0.309873 |
| 318 | 0.0007403 | 0.31085 |
| 319 | 0.0007465 | 0.311828 |
| 320 | 0.0007527 | 0.312805 |
| 321 | 0.0007589 | 0.313783 |
| 322 | 0.0007652 | 0.314761 |
| 323 | 0.0007715 | 0.315738 |
| 324 | 0.0007779 | 0.316716 |
| 325 | 0.0007844 | 0.317693 |
| 326 | 0.0007909 | 0.318671 |
| 327 | 0.0007974 | 0.319648 |
| 328 | 0.0008040 | 0.320626 |
| 329 | 0.0008107 | 0.321603 |
| 330 | 0.0008174 | 0.322581 |
| 331 | 0.0008242 | 0.323558 |
| 332 | 0.0008310 | 0.324536 |
| 333 | 0.0008379 | 0.325513 |
| 334 | 0.0008449 | 0.326491 |
| 335 | 0.0008519 | 0.327468 |
| 336 | 0.0008589 | 0.328446 |
| 337 | 0.0008660 | 0.329423 |
| 338 | 0.0008732 | 0.330401 |
| 339 | 0.0008805 | 0.331378 |
| 340 | 0.0008877 | 0.332356 |
| 341 | 0.0008951 | 0.333333 |
| 342 | 0.0009025 | 0.334311 |
| 343 | 0.0009100 | 0.335288 |
| 344 | 0.0009175 | 0.336266 |
| 345 | 0.0009251 | 0.337243 |
| 346 | 0.0009328 | 0.338221 |
| 347 | 0.0009405 | 0.339198 |
| 348 | 0.0009483 | 0.340176 |
| 349 | 0.0009562 | 0.341153 |
| 350 | 0.0009641 | 0.342131 |
| 351 | 0.0009721 | 0.343109 |
| 352 | 0.0009802 | 0.344086 |
| 353 | 0.0009883 | 0.345064 |
| 354 | 0.0009965 | 0.346041 |
| 355 | 0.0010043 | 0.347019 |
| 356 | 0.0010118 | 0.347996 |
| 357 | 0.0010194 | 0.348974 |
| 358 | 0.0010270 | 0.349951 |
| 359 | 0.0010347 | 0.350929 |
| 360 | 0.0010425 | 0.351906 |
| 361 | 0.0010503 | 0.352884 |
| 362 | 0.0010581 | 0.353861 |
| 363 | 0.0010660 | 0.354839 |
| 364 | 0.0010740 | 0.355816 |
| 365 | 0.0010821 | 0.356794 |
| 366 | 0.0010902 | 0.357771 |
| 367 | 0.0010983 | 0.358749 |
| 368 | 0.0011066 | 0.359726 |
| 369 | 0.0011148 | 0.360704 |
| 370 | 0.0011232 | 0.361681 |
| 371 | 0.0011316 | 0.362659 |
| 372 | 0.0011401 | 0.363636 |
| 373 | 0.0011486 | 0.364614 |
| 374 | 0.0011572 | 0.365591 |
| 375 | 0.0011659 | 0.366569 |
| 376 | 0.0011746 | 0.367546 |
| 377 | 0.0011834 | 0.368524 |
| 378 | 0.0011923 | 0.369501 |
| 379 | 0.0012012 | 0.370479 |
| 380 | 0.0012102 | 0.371457 |
| 381 | 0.0012192 | 0.372434 |
| 382 | 0.0012284 | 0.373412 |
| 383 | 0.0012376 | 0.374389 |
| 384 | 0.0012468 | 0.375367 |
| 385 | 0.0012562 | 0.376344 |
| 386 | 0.0012656 | 0.377322 |
| 387 | 0.0012751 | 0.378299 |
| 388 | 0.0012846 | 0.379277 |
| 389 | 0.0012942 | 0.380254 |
| 390 | 0.0013039 | 0.381232 |
| 391 | 0.0013137 | 0.382209 |
| 392 | 0.0013235 | 0.383187 |
| 393 | 0.0013334 | 0.384164 |
| 394 | 0.0013434 | 0.385142 |
| 395 | 0.0013535 | 0.386119 |
| 396 | 0.0013636 | 0.387097 |
| 397 | 0.0013738 | 0.388074 |
| 398 | 0.0013841 | 0.389052 |
| 399 | 0.0013945 | 0.390029 |
| 400 | 0.0014049 | 0.391007 |
| 401 | 0.0014154 | 0.391984 |
| 402 | 0.0014260 | 0.392962 |
| 403 | 0.0014367 | 0.393939 |
| 404 | 0.0014475 | 0.394917 |
| 405 | 0.0014583 | 0.395894 |
| 406 | 0.0014692 | 0.396872 |
| 407 | 0.0014802 | 0.397849 |
| 408 | 0.0014913 | 0.398827 |
| 409 | 0.0015025 | 0.399804 |
| 410 | 0.0015137 | 0.400782 |
| 411 | 0.0015251 | 0.40176 |
| 412 | 0.0015365 | 0.402737 |
| 413 | 0.0015480 | 0.403715 |
| 414 | 0.0015596 | 0.404692 |
| 415 | 0.0015713 | 0.40567 |
| 416 | 0.0015830 | 0.406647 |
| 417 | 0.0015949 | 0.407625 |
| 418 | 0.0016069 | 0.408602 |
| 419 | 0.0016190 | 0.40958 |
| 420 | 0.0016312 | 0.410557 |
| 421 | 0.0016435 | 0.411535 |
| 422 | 0.0016559 | 0.412512 |
| 423 | 0.0016683 | 0.41349 |
| 424 | 0.0016809 | 0.414467 |
| 425 | 0.0016935 | 0.415445 |
| 426 | 0.0017063 | 0.416422 |
| 427 | 0.0017191 | 0.4174 |
| 428 | 0.0017321 | 0.418377 |
| 429 | 0.0017451 | 0.419355 |
| 430 | 0.0017582 | 0.420332 |
| 431 | 0.0017715 | 0.42131 |
| 432 | 0.0017848 | 0.422287 |
| 433 | 0.0017982 | 0.423265 |
| 434 | 0.0018118 | 0.424242 |
| 435 | 0.0018254 | 0.42522 |
| 436 | 0.0018392 | 0.426197 |
| 437 | 0.0018530 | 0.427175 |

TABLE 1-continued

1-D Sampled Curve with 1024 Unevenly Spaced Samples

| INDX | X | Y |
|---|---|---|
| 438 | 0.0018669 | 0.428152 |
| 439 | 0.0018810 | 0.42913 |
| 440 | 0.0018952 | 0.430108 |
| 441 | 0.0019094 | 0.431085 |
| 442 | 0.0019238 | 0.432063 |
| 443 | 0.0019383 | 0.43304 |
| 444 | 0.0019529 | 0.434018 |
| 445 | 0.0019676 | 0.434995 |
| 446 | 0.0019824 | 0.435973 |
| 447 | 0.0019973 | 0.43695 |
| 448 | 0.0020123 | 0.437928 |
| 449 | 0.0020275 | 0.438905 |
| 450 | 0.0020427 | 0.439883 |
| 451 | 0.0020581 | 0.44086 |
| 452 | 0.0020736 | 0.441838 |
| 453 | 0.0020892 | 0.442815 |
| 454 | 0.0021049 | 0.443793 |
| 455 | 0.0021208 | 0.44477 |
| 456 | 0.0021367 | 0.445748 |
| 457 | 0.0021528 | 0.446725 |
| 458 | 0.0021690 | 0.447703 |
| 459 | 0.0021854 | 0.44868 |
| 460 | 0.0022018 | 0.449658 |
| 461 | 0.0022184 | 0.450635 |
| 462 | 0.0022351 | 0.451613 |
| 463 | 0.0022519 | 0.45259 |
| 464 | 0.0022689 | 0.453568 |
| 465 | 0.0022859 | 0.454545 |
| 466 | 0.0023031 | 0.455523 |
| 467 | 0.0023205 | 0.4565 |
| 468 | 0.0023379 | 0.457478 |
| 469 | 0.0023555 | 0.458456 |
| 470 | 0.0023733 | 0.459433 |
| 471 | 0.0023911 | 0.460411 |
| 472 | 0.0024091 | 0.461388 |
| 473 | 0.0024273 | 0.462366 |
| 474 | 0.0024455 | 0.463343 |
| 475 | 0.0024639 | 0.464321 |
| 476 | 0.0024825 | 0.465298 |
| 477 | 0.0025012 | 0.466276 |
| 478 | 0.0025200 | 0.467253 |
| 479 | 0.0025390 | 0.468231 |
| 480 | 0.0025581 | 0.469208 |
| 481 | 0.0025774 | 0.470186 |
| 482 | 0.0025968 | 0.471163 |
| 483 | 0.0026164 | 0.472141 |
| 484 | 0.0026361 | 0.473118 |
| 485 | 0.0026559 | 0.474096 |
| 486 | 0.0026760 | 0.475073 |
| 487 | 0.0026961 | 0.476051 |
| 488 | 0.0027164 | 0.477028 |
| 489 | 0.0027369 | 0.478006 |
| 490 | 0.0027575 | 0.478983 |
| 491 | 0.0027783 | 0.479961 |
| 492 | 0.0027992 | 0.480938 |
| 493 | 0.0028203 | 0.481916 |
| 494 | 0.0028416 | 0.482893 |
| 495 | 0.0028630 | 0.483871 |
| 496 | 0.0028845 | 0.484848 |
| 497 | 0.0029063 | 0.485826 |
| 498 | 0.0029282 | 0.486804 |
| 499 | 0.0029502 | 0.487781 |
| 500 | 0.0029724 | 0.488759 |
| 501 | 0.0029948 | 0.489736 |
| 502 | 0.0030174 | 0.490714 |
| 503 | 0.0030401 | 0.491691 |
| 504 | 0.0030630 | 0.492669 |
| 505 | 0.0030861 | 0.493646 |
| 506 | 0.0031094 | 0.494624 |
| 507 | 0.0031328 | 0.495601 |
| 508 | 0.0031564 | 0.496579 |
| 509 | 0.0031802 | 0.497556 |
| 510 | 0.0032041 | 0.498534 |
| 511 | 0.0032283 | 0.499511 |
| 512 | 0.0032526 | 0.500489 |
| 513 | 0.0032771 | 0.501466 |
| 514 | 0.0033018 | 0.502444 |
| 515 | 0.0033266 | 0.503421 |
| 516 | 0.0033517 | 0.504399 |
| 517 | 0.0033770 | 0.505376 |
| 518 | 0.0034024 | 0.506354 |
| 519 | 0.0034280 | 0.507331 |
| 520 | 0.0034539 | 0.508309 |
| 521 | 0.0034799 | 0.509286 |
| 522 | 0.0035061 | 0.510264 |
| 523 | 0.0035325 | 0.511241 |
| 524 | 0.0035591 | 0.512219 |
| 525 | 0.0035859 | 0.513196 |
| 526 | 0.0036130 | 0.514174 |
| 527 | 0.0036402 | 0.515152 |
| 528 | 0.0036676 | 0.516129 |
| 529 | 0.0036952 | 0.517107 |
| 530 | 0.0037231 | 0.518084 |
| 531 | 0.0037511 | 0.519062 |
| 532 | 0.0037794 | 0.520039 |
| 533 | 0.0038078 | 0.521017 |
| 534 | 0.0038365 | 0.521994 |
| 535 | 0.0038654 | 0.522972 |
| 536 | 0.0038946 | 0.523949 |
| 537 | 0.0039239 | 0.524927 |
| 538 | 0.0039535 | 0.525904 |
| 539 | 0.0039832 | 0.526882 |
| 540 | 0.0040132 | 0.527859 |
| 541 | 0.0040434 | 0.528837 |
| 542 | 0.0040739 | 0.529814 |
| 543 | 0.0041045 | 0.530792 |
| 544 | 0.0041354 | 0.531769 |
| 545 | 0.0041666 | 0.532747 |
| 546 | 0.0041979 | 0.533724 |
| 547 | 0.0042295 | 0.534702 |
| 548 | 0.0042614 | 0.535679 |
| 549 | 0.0042934 | 0.536657 |
| 550 | 0.0043257 | 0.537634 |
| 551 | 0.0043583 | 0.538612 |
| 552 | 0.0043911 | 0.539589 |
| 553 | 0.0044242 | 0.540567 |
| 554 | 0.0044575 | 0.541544 |
| 555 | 0.0044910 | 0.542522 |
| 556 | 0.0045248 | 0.5435 |
| 557 | 0.0045589 | 0.544477 |
| 558 | 0.0045932 | 0.545455 |
| 559 | 0.0046278 | 0.546432 |
| 560 | 0.0046626 | 0.54741 |
| 561 | 0.0046977 | 0.548387 |
| 562 | 0.0047331 | 0.549365 |
| 563 | 0.0047687 | 0.550342 |
| 564 | 0.0048046 | 0.55132 |
| 565 | 0.0048407 | 0.552297 |
| 566 | 0.0048772 | 0.553275 |
| 567 | 0.0049139 | 0.554252 |
| 568 | 0.0049509 | 0.55523 |
| 569 | 0.0049881 | 0.556207 |
| 570 | 0.0050257 | 0.557185 |
| 571 | 0.0050635 | 0.558162 |
| 572 | 0.0051016 | 0.55914 |
| 573 | 0.0051400 | 0.560117 |
| 574 | 0.0051787 | 0.561095 |
| 575 | 0.0052177 | 0.562072 |
| 576 | 0.0052570 | 0.56305 |
| 577 | 0.0052965 | 0.564027 |
| 578 | 0.0053364 | 0.565005 |
| 579 | 0.0053766 | 0.565982 |
| 580 | 0.0054171 | 0.56696 |
| 581 | 0.0054578 | 0.567937 |
| 582 | 0.0054989 | 0.568915 |
| 583 | 0.0055403 | 0.569892 |
| 584 | 0.0055820 | 0.57087 |
| 585 | 0.0056240 | 0.571848 |
| 586 | 0.0056664 | 0.572825 |
| 587 | 0.0057090 | 0.573803 |
| 588 | 0.0057520 | 0.57478 |
| 589 | 0.0057953 | 0.575758 |

TABLE 1-continued

1-D Sampled Curve with 1024 Unevenly Spaced Samples

| INDX | X | Y |
|---|---|---|
| 590 | 0.0058389 | 0.576735 |
| 591 | 0.0058828 | 0.577713 |
| 592 | 0.0059271 | 0.57869 |
| 593 | 0.0059717 | 0.579668 |
| 594 | 0.0060167 | 0.580645 |
| 595 | 0.0060620 | 0.581623 |
| 596 | 0.0061076 | 0.5826 |
| 597 | 0.0061536 | 0.583578 |
| 598 | 0.0061999 | 0.584555 |
| 599 | 0.0062466 | 0.585533 |
| 600 | 0.0062936 | 0.58651 |
| 601 | 0.0063410 | 0.587488 |
| 602 | 0.0063887 | 0.588465 |
| 603 | 0.0064368 | 0.589443 |
| 604 | 0.0064852 | 0.59042 |
| 605 | 0.0065340 | 0.591398 |
| 606 | 0.0065832 | 0.592375 |
| 607 | 0.0066328 | 0.593353 |
| 608 | 0.0066827 | 0.59433 |
| 609 | 0.0067330 | 0.595308 |
| 610 | 0.0067837 | 0.596285 |
| 611 | 0.0068347 | 0.597263 |
| 612 | 0.0068862 | 0.59824 |
| 613 | 0.0069380 | 0.599218 |
| 614 | 0.0069902 | 0.600196 |
| 615 | 0.0070429 | 0.601173 |
| 616 | 0.0070959 | 0.602151 |
| 617 | 0.0071493 | 0.603128 |
| 618 | 0.0072031 | 0.604106 |
| 619 | 0.0072573 | 0.605083 |
| 620 | 0.0073119 | 0.606061 |
| 621 | 0.0073670 | 0.607038 |
| 622 | 0.0074224 | 0.608016 |
| 623 | 0.0074783 | 0.608993 |
| 624 | 0.0075346 | 0.609971 |
| 625 | 0.0075913 | 0.610948 |
| 626 | 0.0076485 | 0.611926 |
| 627 | 0.0077060 | 0.612903 |
| 628 | 0.0077640 | 0.613881 |
| 629 | 0.0078225 | 0.614858 |
| 630 | 0.0078813 | 0.615836 |
| 631 | 0.0079407 | 0.616813 |
| 632 | 0.0080004 | 0.617791 |
| 633 | 0.0080607 | 0.618768 |
| 634 | 0.0081213 | 0.619746 |
| 635 | 0.0081825 | 0.620723 |
| 636 | 0.0082441 | 0.621701 |
| 637 | 0.0083061 | 0.622678 |
| 638 | 0.0083686 | 0.623656 |
| 639 | 0.0084316 | 0.624633 |
| 640 | 0.0084951 | 0.625611 |
| 641 | 0.0085590 | 0.626588 |
| 642 | 0.0086235 | 0.627566 |
| 643 | 0.0086884 | 0.628543 |
| 644 | 0.0087538 | 0.629521 |
| 645 | 0.0088197 | 0.630499 |
| 646 | 0.0088860 | 0.631476 |
| 647 | 0.0089529 | 0.632454 |
| 648 | 0.0090203 | 0.633431 |
| 649 | 0.0090882 | 0.634409 |
| 650 | 0.0091566 | 0.635386 |
| 651 | 0.0092255 | 0.636364 |
| 652 | 0.0092950 | 0.637341 |
| 653 | 0.0093650 | 0.638319 |
| 654 | 0.0094354 | 0.639296 |
| 655 | 0.0095065 | 0.640274 |
| 656 | 0.0095780 | 0.641251 |
| 657 | 0.0096501 | 0.642229 |
| 658 | 0.0097228 | 0.643206 |
| 659 | 0.0097959 | 0.644184 |
| 660 | 0.0098697 | 0.645161 |
| 661 | 0.0099440 | 0.646139 |
| 662 | 0.0100188 | 0.647116 |
| 663 | 0.0100942 | 0.648094 |
| 664 | 0.0101702 | 0.649071 |
| 665 | 0.0102468 | 0.650049 |
| 666 | 0.0103239 | 0.651026 |
| 667 | 0.0104016 | 0.652004 |
| 668 | 0.0104799 | 0.652981 |
| 669 | 0.0105588 | 0.653959 |
| 670 | 0.0106383 | 0.654936 |
| 671 | 0.0107183 | 0.655914 |
| 672 | 0.0107990 | 0.656891 |
| 673 | 0.0108803 | 0.657869 |
| 674 | 0.0109622 | 0.658847 |
| 675 | 0.0110447 | 0.659824 |
| 676 | 0.0111278 | 0.660802 |
| 677 | 0.0112116 | 0.661779 |
| 678 | 0.0112960 | 0.662757 |
| 679 | 0.0113810 | 0.663734 |
| 680 | 0.0114667 | 0.664712 |
| 681 | 0.0115530 | 0.665689 |
| 682 | 0.0116400 | 0.666667 |
| 683 | 0.0117276 | 0.667644 |
| 684 | 0.0118158 | 0.668622 |
| 685 | 0.0119048 | 0.669599 |
| 686 | 0.0119944 | 0.670577 |
| 687 | 0.0120847 | 0.671554 |
| 688 | 0.0121756 | 0.672532 |
| 689 | 0.0122673 | 0.673509 |
| 690 | 0.0123596 | 0.674487 |
| 691 | 0.0124527 | 0.675464 |
| 692 | 0.0125464 | 0.676442 |
| 693 | 0.0126408 | 0.677419 |
| 694 | 0.0127360 | 0.678397 |
| 695 | 0.0128318 | 0.679374 |
| 696 | 0.0129284 | 0.680352 |
| 697 | 0.0130257 | 0.681329 |
| 698 | 0.0131238 | 0.682307 |
| 699 | 0.0132226 | 0.683284 |
| 700 | 0.0133221 | 0.684262 |
| 701 | 0.0134224 | 0.685239 |
| 702 | 0.0135234 | 0.686217 |
| 703 | 0.0136252 | 0.687195 |
| 704 | 0.0137278 | 0.688172 |
| 705 | 0.0138311 | 0.68915 |
| 706 | 0.0139352 | 0.690127 |
| 707 | 0.0140401 | 0.691105 |
| 708 | 0.0141458 | 0.692082 |
| 709 | 0.0142522 | 0.69306 |
| 710 | 0.0143595 | 0.694037 |
| 711 | 0.0144676 | 0.695015 |
| 712 | 0.0145765 | 0.695992 |
| 713 | 0.0146862 | 0.69697 |
| 714 | 0.0147968 | 0.697947 |
| 715 | 0.0149082 | 0.698925 |
| 716 | 0.0150204 | 0.699902 |
| 717 | 0.0151334 | 0.70088 |
| 718 | 0.0152473 | 0.701857 |
| 719 | 0.0153621 | 0.702835 |
| 720 | 0.0154777 | 0.703812 |
| 721 | 0.0155942 | 0.70479 |
| 722 | 0.0157116 | 0.705767 |
| 723 | 0.0158299 | 0.706745 |
| 724 | 0.0159491 | 0.707722 |
| 725 | 0.0160693 | 0.7087 |
| 726 | 0.0161903 | 0.709677 |
| 727 | 0.0163123 | 0.710655 |
| 728 | 0.0164352 | 0.711632 |
| 729 | 0.0165590 | 0.71261 |
| 730 | 0.0166838 | 0.713587 |
| 731 | 0.0168095 | 0.714565 |
| 732 | 0.0169361 | 0.715543 |
| 733 | 0.0170637 | 0.71652 |
| 734 | 0.0171923 | 0.717498 |
| 735 | 0.0173218 | 0.718475 |
| 736 | 0.0174523 | 0.719453 |
| 737 | 0.0175837 | 0.72043 |
| 738 | 0.0177162 | 0.721408 |
| 739 | 0.0178497 | 0.722385 |
| 740 | 0.0179842 | 0.723363 |
| 741 | 0.0181197 | 0.72434 |

TABLE 1-continued

1-D Sampled Curve with 1024 Unevenly Spaced Samples

| INDX | X | Y |
|---|---|---|
| 742 | 0.0182562 | 0.725318 |
| 743 | 0.0183937 | 0.726295 |
| 744 | 0.0185323 | 0.727273 |
| 745 | 0.0186719 | 0.72825 |
| 746 | 0.0188126 | 0.729228 |
| 747 | 0.0189543 | 0.730205 |
| 748 | 0.0190971 | 0.731183 |
| 749 | 0.0192409 | 0.73216 |
| 750 | 0.0193859 | 0.733138 |
| 751 | 0.0195320 | 0.734115 |
| 752 | 0.0196791 | 0.735093 |
| 753 | 0.0198274 | 0.73607 |
| 754 | 0.0199767 | 0.737048 |
| 755 | 0.0201272 | 0.738025 |
| 756 | 0.0202789 | 0.739003 |
| 757 | 0.0204316 | 0.73998 |
| 758 | 0.0205856 | 0.740958 |
| 759 | 0.0207406 | 0.741935 |
| 760 | 0.0208969 | 0.742913 |
| 761 | 0.0210543 | 0.743891 |
| 762 | 0.0212129 | 0.744868 |
| 763 | 0.0213728 | 0.745846 |
| 764 | 0.0215338 | 0.746823 |
| 765 | 0.0216960 | 0.747801 |
| 766 | 0.0218595 | 0.748778 |
| 767 | 0.0220241 | 0.749756 |
| 768 | 0.0221901 | 0.750733 |
| 769 | 0.0223572 | 0.751711 |
| 770 | 0.0225257 | 0.752688 |
| 771 | 0.0226954 | 0.753666 |
| 772 | 0.0228664 | 0.754643 |
| 773 | 0.0230386 | 0.755621 |
| 774 | 0.0232122 | 0.756598 |
| 775 | 0.0233871 | 0.757576 |
| 776 | 0.0235633 | 0.758553 |
| 777 | 0.0237408 | 0.759531 |
| 778 | 0.0239196 | 0.760508 |
| 779 | 0.0240998 | 0.761486 |
| 780 | 0.0242814 | 0.762463 |
| 781 | 0.0244643 | 0.763441 |
| 782 | 0.0246486 | 0.764418 |
| 783 | 0.0248343 | 0.765396 |
| 784 | 0.0250214 | 0.766373 |
| 785 | 0.0252089 | 0.767351 |
| 786 | 0.0253967 | 0.768328 |
| 787 | 0.0255859 | 0.769306 |
| 788 | 0.0257764 | 0.770283 |
| 789 | 0.0259685 | 0.771261 |
| 790 | 0.0261619 | 0.772239 |
| 791 | 0.0263568 | 0.773216 |
| 792 | 0.0265531 | 0.774194 |
| 793 | 0.0267509 | 0.775171 |
| 794 | 0.0269502 | 0.776149 |
| 795 | 0.0271509 | 0.777126 |
| 796 | 0.0273532 | 0.778104 |
| 797 | 0.0275569 | 0.779081 |
| 798 | 0.0277622 | 0.780059 |
| 799 | 0.0279690 | 0.781036 |
| 800 | 0.0281773 | 0.782014 |
| 801 | 0.0283872 | 0.782991 |
| 802 | 0.0285987 | 0.783969 |
| 803 | 0.0288117 | 0.784946 |
| 804 | 0.0290263 | 0.785924 |
| 805 | 0.0292426 | 0.786901 |
| 806 | 0.0294604 | 0.787879 |
| 807 | 0.0296798 | 0.788856 |
| 808 | 0.0299009 | 0.789834 |
| 809 | 0.0301237 | 0.790811 |
| 810 | 0.0303481 | 0.791789 |
| 811 | 0.0305741 | 0.792766 |
| 812 | 0.0308019 | 0.793744 |
| 813 | 0.0310313 | 0.794721 |
| 814 | 0.0312625 | 0.795699 |
| 815 | 0.0314953 | 0.796676 |
| 816 | 0.0317300 | 0.797654 |
| 817 | 0.0319663 | 0.798631 |

TABLE 1-continued

1-D Sampled Curve with 1024 Unevenly Spaced Samples

| INDX | X | Y |
|---|---|---|
| 818 | 0.0322044 | 0.799609 |
| 819 | 0.0324443 | 0.800587 |
| 820 | 0.0326860 | 0.801564 |
| 821 | 0.0329295 | 0.802542 |
| 822 | 0.0331748 | 0.803519 |
| 823 | 0.0334219 | 0.804497 |
| 824 | 0.0336709 | 0.805474 |
| 825 | 0.0339217 | 0.806452 |
| 826 | 0.0341743 | 0.807429 |
| 827 | 0.0344289 | 0.808407 |
| 828 | 0.0346854 | 0.809384 |
| 829 | 0.0349437 | 0.810362 |
| 830 | 0.0352040 | 0.811339 |
| 831 | 0.0354663 | 0.812317 |
| 832 | 0.0357305 | 0.813294 |
| 833 | 0.0359966 | 0.814272 |
| 834 | 0.0362648 | 0.815249 |
| 835 | 0.0365349 | 0.816227 |
| 836 | 0.0368071 | 0.817204 |
| 837 | 0.0370812 | 0.818182 |
| 838 | 0.0373575 | 0.819159 |
| 839 | 0.0376357 | 0.820137 |
| 840 | 0.0379161 | 0.821114 |
| 841 | 0.0381985 | 0.822092 |
| 842 | 0.0384831 | 0.823069 |
| 843 | 0.0387697 | 0.824047 |
| 844 | 0.0390585 | 0.825024 |
| 845 | 0.0393495 | 0.826002 |
| 846 | 0.0396426 | 0.826979 |
| 847 | 0.0399414 | 0.827957 |
| 848 | 0.0402471 | 0.828935 |
| 849 | 0.0405552 | 0.829912 |
| 850 | 0.0408656 | 0.83089 |
| 851 | 0.0411784 | 0.831867 |
| 852 | 0.0414935 | 0.832845 |
| 853 | 0.0418111 | 0.833822 |
| 854 | 0.0421312 | 0.8348 |
| 855 | 0.0424537 | 0.835777 |
| 856 | 0.0427786 | 0.836755 |
| 857 | 0.0431060 | 0.837732 |
| 858 | 0.0434360 | 0.83871 |
| 859 | 0.0437684 | 0.839687 |
| 860 | 0.0441035 | 0.840665 |
| 861 | 0.0444410 | 0.841642 |
| 862 | 0.0447812 | 0.84262 |
| 863 | 0.0451239 | 0.843597 |
| 864 | 0.0454693 | 0.844575 |
| 865 | 0.0458174 | 0.845552 |
| 866 | 0.0461681 | 0.84653 |
| 867 | 0.0465214 | 0.847507 |
| 868 | 0.0468775 | 0.848485 |
| 869 | 0.0472363 | 0.849462 |
| 870 | 0.0475979 | 0.85044 |
| 871 | 0.0479622 | 0.851417 |
| 872 | 0.0483293 | 0.852395 |
| 873 | 0.0486992 | 0.853372 |
| 874 | 0.0490720 | 0.85435 |
| 875 | 0.0494476 | 0.855327 |
| 876 | 0.0498261 | 0.856305 |
| 877 | 0.0502074 | 0.857283 |
| 878 | 0.0505917 | 0.85826 |
| 879 | 0.0509790 | 0.859238 |
| 880 | 0.0513692 | 0.860215 |
| 881 | 0.0517624 | 0.861193 |
| 882 | 0.0521586 | 0.86217 |
| 883 | 0.0525578 | 0.863148 |
| 884 | 0.0529601 | 0.864125 |
| 885 | 0.0533655 | 0.865103 |
| 886 | 0.0537739 | 0.86608 |
| 887 | 0.0541855 | 0.867058 |
| 888 | 0.0546003 | 0.868035 |
| 889 | 0.0550182 | 0.869013 |
| 890 | 0.0554393 | 0.86999 |
| 891 | 0.0558636 | 0.870968 |
| 892 | 0.0562912 | 0.871945 |
| 893 | 0.0567221 | 0.872923 |

TABLE 1-continued

1-D Sampled Curve with 1024 Unevenly Spaced Samples

| INDX | X | Y |
|---|---|---|
| 894 | 0.0571562 | 0.8739 |
| 895 | 0.0575937 | 0.874878 |
| 896 | 0.0580346 | 0.875855 |
| 897 | 0.0584788 | 0.876833 |
| 898 | 0.0589264 | 0.87781 |
| 899 | 0.0593774 | 0.878788 |
| 900 | 0.0598319 | 0.879765 |
| 901 | 0.0602899 | 0.880743 |
| 902 | 0.0607513 | 0.88172 |
| 903 | 0.0612163 | 0.882698 |
| 904 | 0.0616849 | 0.883675 |
| 905 | 0.0621570 | 0.884653 |
| 906 | 0.0626328 | 0.88563 |
| 907 | 0.0631145 | 0.886608 |
| 908 | 0.0636662 | 0.887586 |
| 909 | 0.0642227 | 0.888563 |
| 910 | 0.0647841 | 0.889541 |
| 911 | 0.0653504 | 0.890518 |
| 912 | 0.0659217 | 0.891496 |
| 913 | 0.0664979 | 0.892473 |
| 914 | 0.0670792 | 0.893451 |
| 915 | 0.0676656 | 0.894428 |
| 916 | 0.0682570 | 0.895406 |
| 917 | 0.0688537 | 0.896383 |
| 918 | 0.0694556 | 0.897361 |
| 919 | 0.0700627 | 0.898338 |
| 920 | 0.0706751 | 0.899316 |
| 921 | 0.0712929 | 0.900293 |
| 922 | 0.0719161 | 0.901271 |
| 923 | 0.0725448 | 0.902248 |
| 924 | 0.0731789 | 0.903226 |
| 925 | 0.0738186 | 0.904203 |
| 926 | 0.0744638 | 0.905181 |
| 927 | 0.0751148 | 0.906158 |
| 928 | 0.0757714 | 0.907136 |
| 929 | 0.0764337 | 0.908113 |
| 930 | 0.0771018 | 0.909091 |
| 931 | 0.0777758 | 0.910068 |
| 932 | 0.0784557 | 0.911046 |
| 933 | 0.0791415 | 0.912023 |
| 934 | 0.0798333 | 0.913001 |
| 935 | 0.0805311 | 0.913978 |
| 936 | 0.0812350 | 0.914956 |
| 937 | 0.0819451 | 0.915934 |
| 938 | 0.0826615 | 0.916911 |
| 939 | 0.0833840 | 0.917889 |
| 940 | 0.0841129 | 0.918866 |
| 941 | 0.0848482 | 0.919844 |
| 942 | 0.0855898 | 0.920821 |
| 943 | 0.0863380 | 0.921799 |
| 944 | 0.0870927 | 0.922776 |
| 945 | 0.0878540 | 0.923754 |
| 946 | 0.0886220 | 0.924731 |
| 947 | 0.0893966 | 0.925709 |
| 948 | 0.0901781 | 0.926686 |
| 949 | 0.0909664 | 0.927664 |
| 950 | 0.0917615 | 0.928641 |
| 951 | 0.0925636 | 0.929619 |
| 952 | 0.0933728 | 0.930596 |
| 953 | 0.0941890 | 0.931574 |
| 954 | 0.0950123 | 0.932551 |
| 955 | 0.0958428 | 0.933529 |
| 956 | 0.0966806 | 0.934506 |
| 957 | 0.0975257 | 0.935484 |
| 958 | 0.0983782 | 0.936461 |
| 959 | 0.0992382 | 0.937439 |
| 960 | 0.1001707 | 0.938416 |
| 961 | 0.1015886 | 0.939394 |
| 962 | 0.1030266 | 0.940371 |
| 963 | 0.1044850 | 0.941349 |
| 964 | 0.1059640 | 0.942326 |
| 965 | 0.1074639 | 0.943304 |
| 966 | 0.1089851 | 0.944282 |
| 967 | 0.1105278 | 0.945259 |
| 968 | 0.1120923 | 0.946237 |
| 969 | 0.1136790 | 0.947214 |
| 970 | 0.1152881 | 0.948192 |
| 971 | 0.1169201 | 0.949169 |
| 972 | 0.1185751 | 0.950147 |
| 973 | 0.1202535 | 0.951124 |
| 974 | 0.1219558 | 0.952102 |
| 975 | 0.1236821 | 0.953079 |
| 976 | 0.1254328 | 0.954057 |
| 977 | 0.1272083 | 0.955034 |
| 978 | 0.1290090 | 0.956012 |
| 979 | 0.1308351 | 0.956989 |
| 980 | 0.1326871 | 0.957967 |
| 981 | 0.1345653 | 0.958944 |
| 982 | 0.1364701 | 0.959922 |
| 983 | 0.1384019 | 0.960899 |
| 984 | 0.1403610 | 0.961877 |
| 985 | 0.1423478 | 0.962854 |
| 986 | 0.1443627 | 0.963832 |
| 987 | 0.1464062 | 0.964809 |
| 988 | 0.1484786 | 0.965787 |
| 989 | 0.1505804 | 0.966764 |
| 990 | 0.1527119 | 0.967742 |
| 991 | 0.1548735 | 0.968719 |
| 992 | 0.1570658 | 0.969697 |
| 993 | 0.1603315 | 0.970674 |
| 994 | 0.1655898 | 0.971652 |
| 995 | 0.1710207 | 0.97263 |
| 996 | 0.1766297 | 0.973607 |
| 997 | 0.1824226 | 0.974585 |
| 998 | 0.1884055 | 0.975562 |
| 999 | 0.1945847 | 0.97654 |
| 1000 | 0.2009665 | 0.977517 |
| 1001 | 0.2075576 | 0.978495 |
| 1002 | 0.2143648 | 0.979472 |
| 1003 | 0.2213954 | 0.98045 |
| 1004 | 0.2286565 | 0.981427 |
| 1005 | 0.2361557 | 0.982405 |
| 1006 | 0.2439009 | 0.983382 |
| 1007 | 0.2525772 | 0.98436 |
| 1008 | 0.2689726 | 0.985337 |
| 1009 | 0.2864322 | 0.986315 |
| 1010 | 0.3050252 | 0.987292 |
| 1011 | 0.3248251 | 0.98827 |
| 1012 | 0.3459103 | 0.989247 |
| 1013 | 0.3683642 | 0.990225 |
| 1014 | 0.3922756 | 0.991202 |
| 1015 | 0.4261140 | 0.99218 |
| 1016 | 0.4656966 | 0.993157 |
| 1017 | 0.5089562 | 0.994135 |
| 1018 | 0.5562343 | 0.995112 |
| 1019 | 0.6079041 | 0.99609 |
| 1020 | 0.6799043 | 0.997067 |
| 1021 | 0.7732119 | 0.998045 |
| 1022 | 0.8793247 | 0.999022 |
| 1023 | 1.0000000 | 1 |

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results. Moreover, the technologies described here can be used with interpolation of non-image data.

What is claimed is:

1. A method comprising:
    obtaining a set of unevenly spaced sample points, x, and corresponding sample outputs, y, of a function $y=f(x)$ within a domain;
    populating a first Graphics Processing Unit (GPU) texture comprising first locations corresponding to a set of evenly spaced sample points within the domain, with index values in the first locations corresponding to second locations storing the sample outputs, y;
receiving an input value of image data;
identifying one of the first locations corresponding to the input value;
finding two index values stored in the first locations using the one of the first locations as a starting point, the finding comprising:
  looking up a first index value in the one of the first locations in the first GPU texture; and
  determining the first index value and a second index value such that corresponding x values of the unevenly spaced sample points in a second GPU texture bound the input value, the determining comprising:
    looking up an x value in the second GPU texture using the second index value, the second index value being one different than the first index value; and
    incrementally increasing or decreasing the first and second index values while the x values corresponding to the first and second index values fail to bound the input value; and
generating an image data output value corresponding to the input value by interpolation using two sample outputs, y, obtained from the second locations using the two index values.

2. The method of claim 1, wherein the obtaining comprises acquiring a one dimensional sampled curve from a color profile in an image processing application.

3. The method of claim 1, wherein the GPU texture comprises a multidimensional GPU texture, and the identifying comprises:
  converting the input value to a one dimensional index value in accordance with the set of evenly spaced sample points within the domain; and
  converting the one dimensional index value to multidimensional coordinates into the first GPU texture, the multidimensional coordinates specifying the one of the first locations.

4. The method of claim 1, wherein the generating the image data output value comprises:
  looking up the two sample outputs, y, in a third GPU texture, comprising the second locations, using the first and second index values; and
  interpolating between the two sample outputs, y, to obtain the output value.

5. The method of claim 4, wherein the interpolating comprises performing linear interpolation.

6. The method of claim 1, further comprising rendering an image using the image data output value generated by interpolation.

7. A non-transitory computer program product, encoded on a computer-readable medium, operable to cause data processing apparatus to perform operations comprising:
  receiving an input value of image data;
  identifying one of multiple first locations, corresponding to the input value, in a first Graphics Processing Unit (GPU) texture storing index values corresponding to second locations, wherein the second locations store sample outputs, y, of a function y=f(x) within a domain, the function being represented by a set of unevenly spaced sample points, x, and the corresponding sample outputs, y, and the first locations correspond to a set of evenly spaced sample points within the domain;
  finding two index values stored in the first locations using the one of the first locations as a starting point the finding comprising:
    looking up a first index value in the one of the first locations in the first GPU texture; and
    determining the first index value and a second index value such that corresponding x values of the unevenly spaced sample points in a second GPU texture bound the input value, the determining comprising:
      looking up an x value in the second GPU texture using the second index value, the second index value being one different than the first index value; and
      incrementally increasing or decreasing the first and second index values while the x values corresponding to the first and second index values fail to bound the input value; and
  generating an image data output value corresponding to the input value by interpolation using two sample outputs, y, obtained from the second locations using the two index values.

8. The computer program product of claim 7, wherein the receiving comprises receiving a one dimensional sampled curve in a color profile in an image processing application.

9. The computer program product of claim 7, wherein the GPU texture comprises a multidimensional GPU texture, and the identifying comprises:
  converting the input value to a one dimensional index value in accordance with the set of evenly spaced sample points within the domain; and
  converting the one dimensional index value to multidimensional coordinates into the first GPU texture, the multidimensional coordinates specifying the one of the first locations.

10. The computer program product of claim 7, wherein the generating the image data output value comprises:
  looking up the two sample outputs, y, in a third GPU texture, comprising the second locations, using the first and second index values; and
  interpolating between the two sample outputs, y, to obtain the output value.

11. The computer program product of claim 10, wherein the interpolating comprises performing linear interpolation.

12. The computer program product of claim 7, wherein the operations further comprise rendering an image using the image data output value generated by interpolation.

13. A system comprising:
  a memory structure comprising an array of first locations storing index values corresponding to second locations, wherein the second locations store sample outputs, y, of a function y=f(x) within a domain, the function being represented by a set of unevenly spaced sample points, x, and the corresponding sample outputs, y, and the first locations correspond to a set of evenly spaced sample points within the domain, wherein the memory structure comprises a first texture in a Graphics Processing Unit (GPU) populated with the index values corresponding to the second locations; and
  one or more computers operable to effect an image processing application configured to receive an input value, identify one of the first locations corresponding to the input value, find two index values stored in the first locations using the one of the first locations as a starting point including looking up a first index value in the one of the first locations in the first texture, and to determine the first index value and a second index value such that corresponding x values of the unevenly spaced sample points in a second texture bound the input value including to look up an x value in the second texture using the second index value, the second index value being one different than the first index value, and to incrementally increase or decrease the first and second index values while the x values corresponding to the first and second index values fail to bound the input value, and generate an output value corresponding to the input value by interpolation using two sample outputs, y, obtained from the second locations using the two index values.

14. The system of claim 13, wherein the first texture comprises a multidimensional texture, and the one or more computers are operable to convert the input value to a one dimensional index value in accordance with the set of evenly spaced sample points within the domain, and to convert the one dimensional index value to multidimensional coordinates into the first texture, the multidimensional coordinates specifying the one of the first locations.

15. The system of claim 13, wherein the one or more computers are operable to look up the two sample outputs, y, in a third texture, comprising the second locations, using the first and second index values; and to interpolate between the two sample outputs, y, to obtain the output value.

* * * * *

UNITED STATES PATENT AND TRADEMARK OFFICE
CERTIFICATE OF CORRECTION

PATENT NO.           : 8,913,073 B2                                    Page 1 of 1
APPLICATION NO.      : 11/502044
DATED                : December 16, 2014
INVENTOR(S)          : Manish S. Kulkarni It is certified that error appears in the above-identified patent and that said Letters Patent is hereby corrected as shown below:

In the Claims

Column 25, Line 52, before "...computer program product", delete "non-transitory", therefor.

Column 25, Line 53, before "...computer-readable medium", insert -- non-transitory --, therefor.

Signed and Sealed this
Seventh Day of April, 2015

Michelle K. Lee
*Director of the United States Patent and Trademark Office*